Sept. 22, 1959 A. DE CRESCENZO 2,905,171
PORTABLE VIBRATING AND WATER THERAPY DEVICE
Filed May 13, 1958 2 Sheets-Sheet 1

INVENTOR.
ANTHONY DE CRESCENZO
BY
*ATTORNEY*

Sept. 22, 1959   A. DE CRESCENZO   2,905,171
PORTABLE VIBRATING AND WATER THERAPY DEVICE
Filed May 13, 1958   2 Sheets-Sheet 2
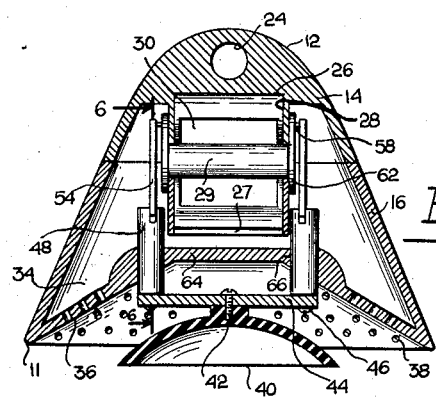
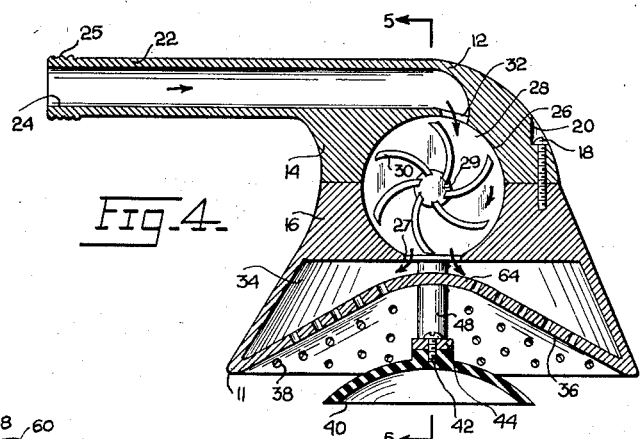
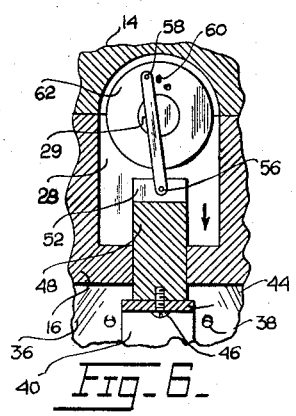
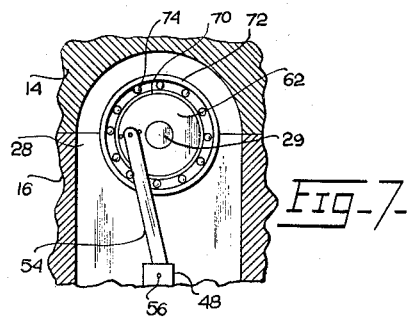
INVENTOR.
ANTHONY DE CRESCENZO
BY
ATTORNEY

United States Patent Office 2,905,171
Patented Sept. 22, 1959

2,905,171

PORTABLE VIBRATING AND WATER THERAPY DEVICE

Anthony De Crescenzo, Brooklyn, N.Y.

Application May 13, 1958, Serial No. 735,050

4 Claims. (Cl. 128—53)

This invention concerns a novel hydromassage device for application to various parts of the human body.

An object of the invention is to provide a device for directly vibrating a portion of the body while applying thereto a therapeutically effective shower of water.

A further object is to provide a device having a mechanically vibrating body provided with means for distributing a shower of water therefrom, said means including an impeller operatively arrange to vibrate the body.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 4 is a sectional view taken on line 4—4 of Fig. 3.

Fig. 5 is a sectional view taken on line 5—5 of Fig. 4.

Fig. 6 is a sectional view on an enlarged scale taken on line 6—6 of Fig. 5 and showing portions of the vibration producing parts.

Fig. 7 is a view on a somewhat reduced scale similar to Fig. 6 and showing another arrangement of the vibration producing parts.

Figure 1:
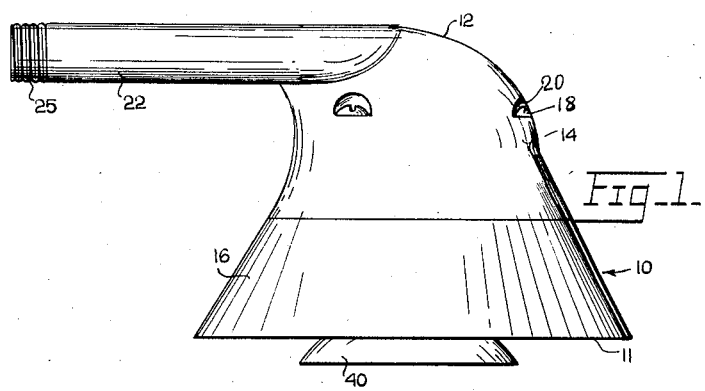
Fig. 1 is a side elevational view of a device embodying the invention.
Figure 2:
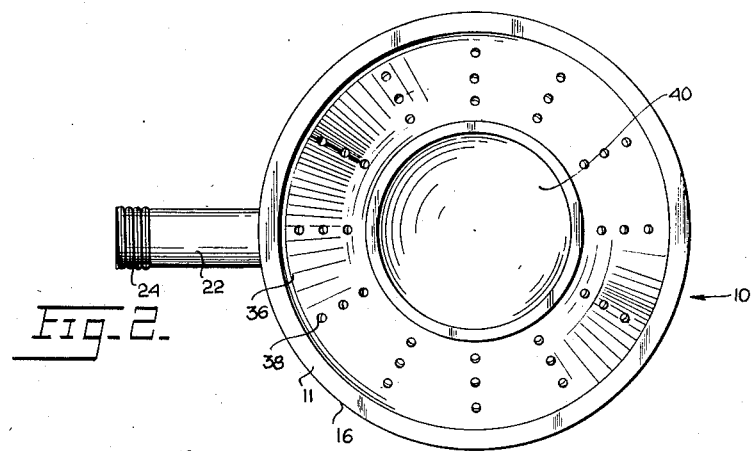
Fig. 2 is a bottom plan view of the device.
Figure 3:
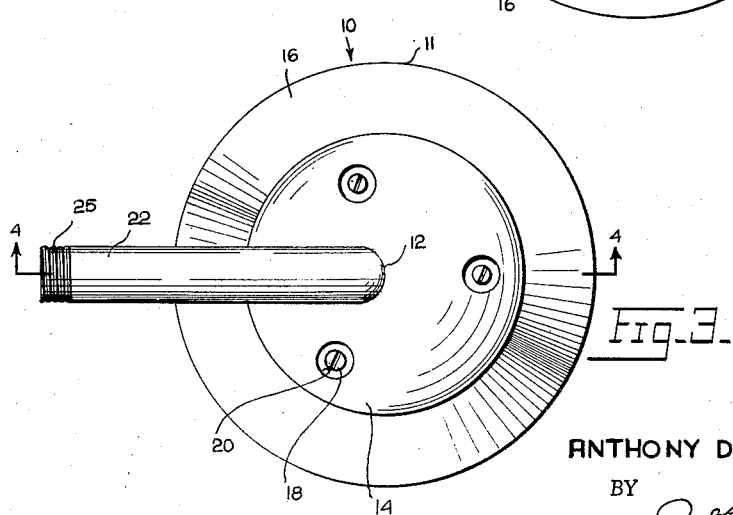
Fig. 3 is a top plan view of the device.

In Figs. 1–6 there is shown a generally tapered bell-shaped casing 10 with a wide circular base edge 11 and a narrow top 12. The casing is formed of two sections 14 and 16 secured together by screws 18 set in recesses 20 in the top section and threaded in boxes in the bottom section. A pipe 22 is integrally formed with the top section 14 and provides an inlet passage 24 for water. The free end of the pipe is threaded at 25 for securing thereto a threaded coupling of a hose for supplying water of proper temperature and pressure to the device. Pipe 22 can be a separate member threaded in passage 24 if desired. Within the top and bottom sections is formed a cylindrical chamber 26 having end walls 28 in which is journaled for rotation a shaft 29. The shaft carries curved rotor vanes or blades 30 which rotate in the chamber 26. Passage 24 communicates with chamber 26 at an outlet 32 so that water enters the chamber therethrough to rotate the vanes as indicated by arrows in the passage and chamber. Beneath chamber 26 in bottom section 16 is formed another chamber 34 having a curved bottom wall 36. This wall has a plurality of holes or perforations 38 for distributing water therefrom in a fine shower or a plurality of fine streams. The entire body of the casing 10 has a rather bell shape terminating in the outwardly flaring base edge 11.

Disposed partially within the space enclosed by the concave side of wall 36 is a flexible rubber suction cup or pad 40. This cup is secured by a threaded bolt 42 to a transversely disposed bar 44. The bar is attached by screws 46 to a pair of spaced parallel rods or shafts 48. The shafts 48 extend upwardly at opposite ends of chamber 34 just beyond walls 28. The top end of each shaft 48 is slotted at 52 as best shown in Figs. 5 and 6.

A link 54 is pivotally held in each slot by a pin 56. The top end of each link is engaged by a pin 58 pivotally mounted in one of a plurality of radially spaced holes 60 of a disk 62. Disks 62 are mounted at opposite ends of the shaft 29 so that upon rotation of the shaft, the shafts 48 are caused to slide axially with respect to the casing 10. A central inner portion 64 of wall 36 is formed with two parallel passages 66 in which the shafts 48 are guided in their reciprocatory movement. If the cup 40 is fixed to a suitable surface such as a substantially flat part of the human body under treatment by the device, the casing 10 will be set in oscillatory motion. These oscillations will be transmitted to the cup and thus applied to the part of the body under treatment.

In operation of the device, a stream of hot or cold water will be sent under pressure through passage 24 in pipe 22. The water entering chamber 26 will cause the rotor blades 30 to rotate and impart rotational motion to disks 62. The links 54 will transmit the driving force to the shafts so that the shafts 48 and casing 10 mutually reciprocate with respect to each other. The water discharged through outlet 27 of chamber 26 into chamber 34 will be discharged therefrom in a spray or shower through holes 38. The holes 38 may be so directed that the streams of water impinge directly upon the part of the body being vibrated through cup 40. Thus there is obtained a mechanical massage effect while stimulating streams of water impinge upon the body. By changing the position of pins 58 in holes 60, the amplitude of movement of the shafts 48 can be adjusted.

The device may be held in the hand of an operator by grasping pipe 22, or the device can be self-supporting upon the body through the suction gripping action of the cup 40. If a solid pad is used instead of a suction cup then the device will be held by pipe 22 as a handle and can be moved over a wide area of the body while simultaneously mechanically massaging the body and applying a therapeutically beneficial water shower.

In Fig. 7, a disk 62 is shown mounted in races 70 and 72 carrying ball bearings 74 to support the disks during rotation thereof. The outer race 72 is secured to wall 28 and race 70 is attached to disk 62.

The device can be made of light metal such as aluminum or it can be fabricated of plastic or other suitable material.

While I have illustrated and described the preferred embodiments of my invention, it is to be understood that I do not limit myself to the precise constructions herein disclosed and that various changes and modifications may be made within the scope of the invention as defined in the appended claims.

Having thus described my invention, what I claim as new, and desire to secure by United States Letters Patent is:

1. A hydromassage device comprising a bell-shaped casing having upper and lower sections detachably secured together, said sections having a first cylindrical chamber therein, a vaned rotor rotatably mounted on a shaft in said chamber, said shaft being journaled in end walls of the chamber, said sections having a second chamber communicating with the first chamber, a pair of disks mounted on opposite ends of the shaft in the second chamber for rotation with said shaft, said second chamber having a perforated wall providing a concave bottom for said lower section, a pair of parallel shafts passing through said perforated wall, the outer ends of said shafts being connected by a transversely disposed bar, a resilient pad secured at the center of said bar and extending outwardly beyond the lower end of said casing, links pivotally connected at one end to each of the parallel shafts and at the other end to said disks for translating rotation motion of the disks to reciprocatory motion of the parallel shafts with respect to the casing, and a pipe secured to the casing and communicating with the first chamber for delivering a stream of water under pressure thereto, whereby the water issues from the casing through said holes in a spray around said pad while said pad reciprocates axially with respect to the casing.

2. A hydromassage device comprising a bell-shaped casing having upper and lower sections detachably secured together, said sections having a first cylindrical chamber therein, a vaned rotor rotatably mounted on a shaft in said chamber, said shaft being journaled in end walls of the chamber, said sections having a second chamber communicating with the first chamber, a pair of disks mounted on opposite ends of the shaft in the second chamber for rotation with said shaft, said second chamber having a perforated wall providing a concave bottom for said lower section, a pair of parallel shafts passing through said perforated wall, the outer ends of said shafts being connected by a transversely disposed bar, a resilient pad secured at the center of said bar and extending outwardly beyond the lower end of said casing, links pivotally connected at one end to each of the parallel shafts and at the other end to said disks for translating rotation motion of the disks to reciprocatory motion of the parallel shafts with respect to the casing, and a pipe secured to the casing and communicating with the first chamber for delivering a stream of water under pressure thereto, whereby the water issues from the casing through said holes in a spray around said pad while said pad reciprocates axially with respect to the casing, said pad being a suction cup for attaching the casing to a part of a human body being treated.

3. A hydromassage device comprising a bell-shaped casing having upper and lower sections detachably secured together, said sections having a first cylindrical chamber therein, a vaned rotor rotatably mounted on a first shaft in said chamber, said shaft being journaled in end walls of the chamber, said sections having a second chamber communicating with the first chamber, a disk mounted on one end of the shaft in the second chamber for rotation with said shaft, said second chamber having a perforated wall providing a concave bottom for said lower section, a second shaft passing through said perforated wall, the outer ends of said second shaft being connected to a pad extending outwardly beyond the lower end of said casing, a link pivotally connected at one end to the second shaft and at the other end to said disk for translating rotation motion of the disk to reciprocatory motion of the second shaft with respect to the casing, and a pipe secured to the casing and communicating with the first chamber for delivering a stream of water under pressure thereto, whereby the water issues from the casing through said holes in a spray around said pad while said pad reciprocates axially with respect to the casing.

4. A hydromassage device comprising a bell-shaped casing having upper and lower sections detachably secured together, said sections having a first cylindrical chamber therein, a vaned rotor rotatably mounted on a shaft in said chamber, said sections having a second chamber communicating with the first chamber, a pair of disks mounted on opposite ends of the shaft in the second chamber for rotation with said shaft, said second chamber having a perforated wall providing a concave bottom for said lower section, a pair of parallel shafts passing through said perforated wall, the outer ends of said shafts being connected by a transversely disposed bar, a resilient pad secured at the center of said bar and extending outwardly beyond the lower end of said casing, links pivotally connected at one end to each of the parallel shafts and at the other end to said disks for translating rotation motion of the disks to reciprocatory motion of the parallel shafts with respect to the casing, and means communicating with the first chamber for delivering a stream of water under pressure thereto, whereby the water issues from the casing through said holes in a spray around said pad while said pad reciprocates axially with respect to the casing, said disks having radially spaced holes for selectively positioning said other ends of the links thereon and adjusting the amplitude of reciprocatory motion of said pad.

References Cited in the file of this patent
UNITED STATES PATENTS

| | | |
|---|---|---|
| 1,267,833 | Wilson | May 28, 1918 |
| 1,948,167 | Cornwell | Feb. 20, 1934 |
| 2,701,563 | Fortin | Feb. 8, 1955 |